I. KREBS.
Wagon-Brake.
No. 22,504.
Patented Jan. 4, 1859
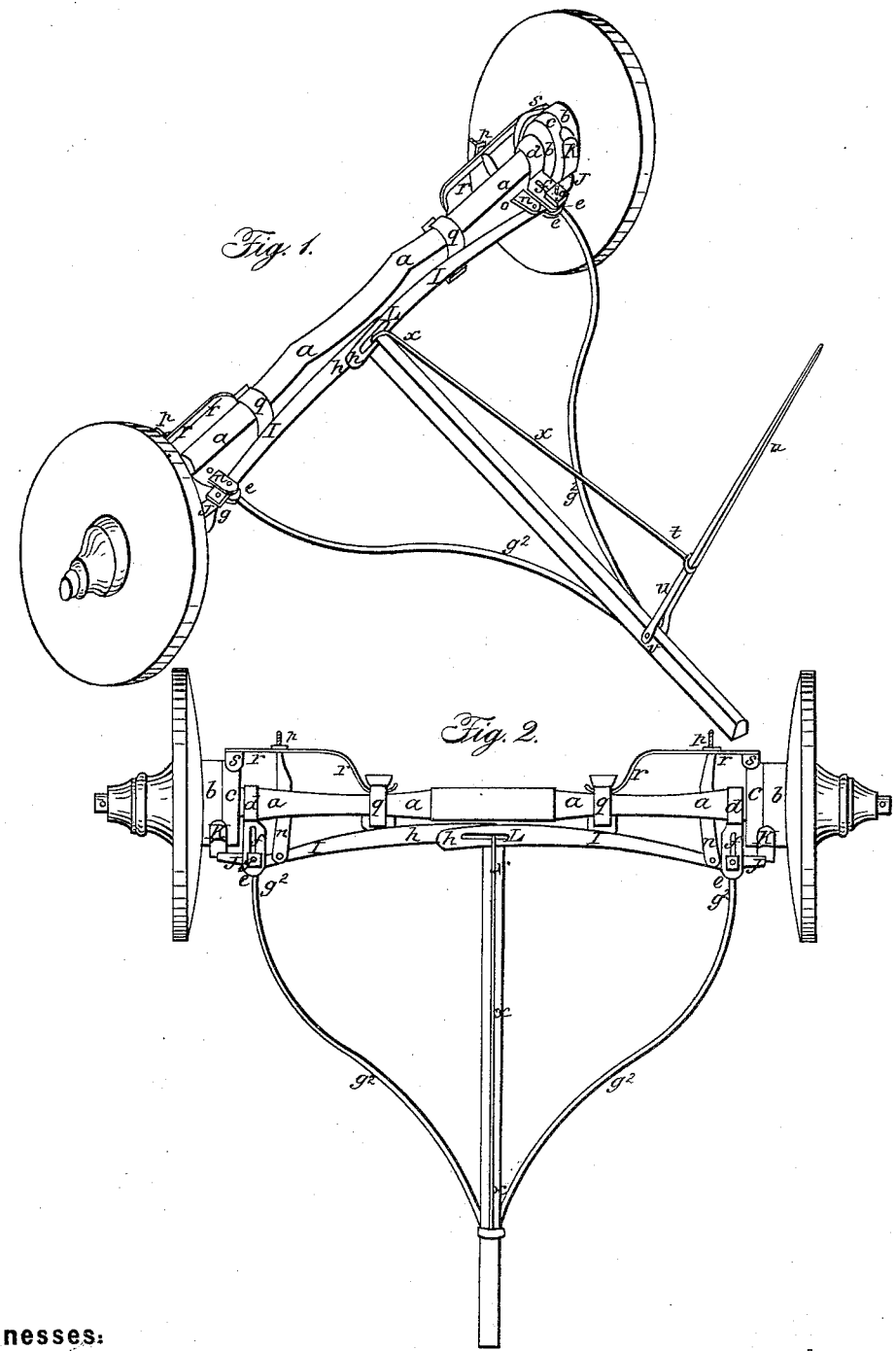
Witnesses:
Inventor:

UNITED STATES PATENT OFFICE.

ISAAC KREBS, OF WINCHESTER, VIRGINIA.

MEANS OF OPERATING CARRIAGE-BRAKES.

Specification of Letters Patent No. 22,504, dated January 4, 1859.

*To all whom it may concern:*

Be it known that I, ISAAC KREBS, of Winchester, in the county of Frederick and State of Virginia, have invented and made certain new and useful Improvements in Brakes for Vehicles; and I do hereby declare that the following is a full, clear, and exact description of the same, reference being had to the accompanying drawings, making a part of this specification, in which—

Figure 1, is a perspective view of the front portion of the running gear of a vehicle with the brake devices attached. Fig. 2, is a top view of the same.

The nature of my improvements, consists, in constructing brakes for vehicles in such a manner, as to enable the application to the circumference of the butt end of the nave or hub part of wheels, two rubber blocks, simultaneously, and in such a way as that the said rubber blocks, when they become worn away to a great extent, can be brought up closer to the circumference of the hub, and be so regulated by a sliding fulcrum and slotted clips, as to do away in a very great measure the necessity of renewing, or attaching new rubber blocks.

The more fully to show the nature of my improvements, I will describe the same.

At $a, a, a, a,$ is represented the axle of a vehicle, and at $b, b, b, b,$ is the butt end of the hub or nave of the wheel, provided with a metallic band $c, c,$ as is usually the case. To the axle $a, a,$ are attached clips $d, d, d, d,$ having jaw like formations $e, e,$ with longitudinal slots, therein as at $f, f,$ through which slots, pass screw pins or bolts $g, g,$ having nuts or taps, fitting thereto. These jaw-clips are confined beneath to the under side of the axle by the flattened ends of the hounds $g^2$—$g^2$. Between the jaws of the clips, are arranged, and connected by the pins or bolts $g, g,$ the shorter arm of horizontal levers $h, i, j,$ and to the shorter arm part is attached in any suitable manner, the concave rubber or friction blocks $k, k.$ The levers $h, i, j,$ have longitudinal slots L, L, formed in their longer ends.

At $n, n,$ is a sliding or adjustable connection rod, which passes transversely through a mortise $o, o,$ formed in the axle. This connection rod $n, n,$ has one end, split or forked, in which the lever $h, i, j,$ rests, and is confined by a joint pin. The other end of this connection rod has a screw thread formed thereon, and this screw end passes through a flexible piece of metal, or spring $r, r, r, r,$ which is held firmly in position by clasps or clips $q, q, q, q,$ surrounding the axle. To the unconfined end of this spring is attached a rubber or friction block $s, s.$ Its face is made concave, or to conform to the circumference of the hub.

In the slots L, L, of the levers $h, i, j,$ is inserted the hooked end of a draw rod $t, t, t.$ This rod extends outwardly in front of the axle $a, a, a, a,$ and is connected to a vertical lever rod $u, u,$ attached by a fulcrum pin or bolt $v,$ to the coupling pole, or to the tongue of the vehicle.

The operation of my brake is as follows viz. When the vehicle is to be checked, the lever rod $u, u$ is taken hold of, or pushed forward, when the draw rod $t, t,$ pulls forward, the ends of the levers $h, i, j,$ thus causing the rubbers $k$ and $s,$ to act simultaneously and to grasp the circumference of the hub, at one and the same time, and when the pressure, or power is withdrawn the rubbers are caused to react, or to relase the hubs through the action of the flexible strips or springs $r, r, r, r.$ In the event of the wearing away of the rubber blocks $k, k,$ the nuts $g, g,$ are loosened, which admits of the tightening or adjusting screw pins or bolts working in the slots $f$ of the clips or clasps $d, d,$ and also of being pushed nearer to the axle, through the agency of the nuts or taps P, P, on the ends of the connection rods or lever supports $n, n,$ the tightening thereof, the adjusting, and bringing the blocks $k,$ and $s,$ more or less close against the circumference of the butt end of the hubs, being readily accomplished.

The slots L L in the ends of the levers $h, i, j,$ are designed to admit of sufficient elongation or extension of the leverage, so as to compensate, for the movement, or changing of the movable fulcrum $g, g.$ Having described the nature, construction, and operation of my improvements, and being fully aware, that rubber blocks and brakes have been applied to the hubs of wheels, and operated also by draw rods, and levers, therefore such devices in themselves I do not claim. But What I do claim and desire to have secured by Letters Patent of the United States, is—

The levers $h$, $i$, $j$, with movable fulcrum $g$, $g$; the sliding, adjusting connection rod and tap $n$, $n$—P; the slotted clip or fulcrum support $d$, $e$, $f$, and the spring rubber $r$, $s$, when constructed, and arranged in combination as hereinbefore set forth and described.

ISAAC KREBS.

Witnesses:
   D. J. RUSSELL,
   STEPHEN JENKINS.